No. 627,718. Patented June 27, 1899.
R. H. CHAPMAN.
GENEALOGICAL CHART.
(Application filed May 2, 1899.)
(No Model.)
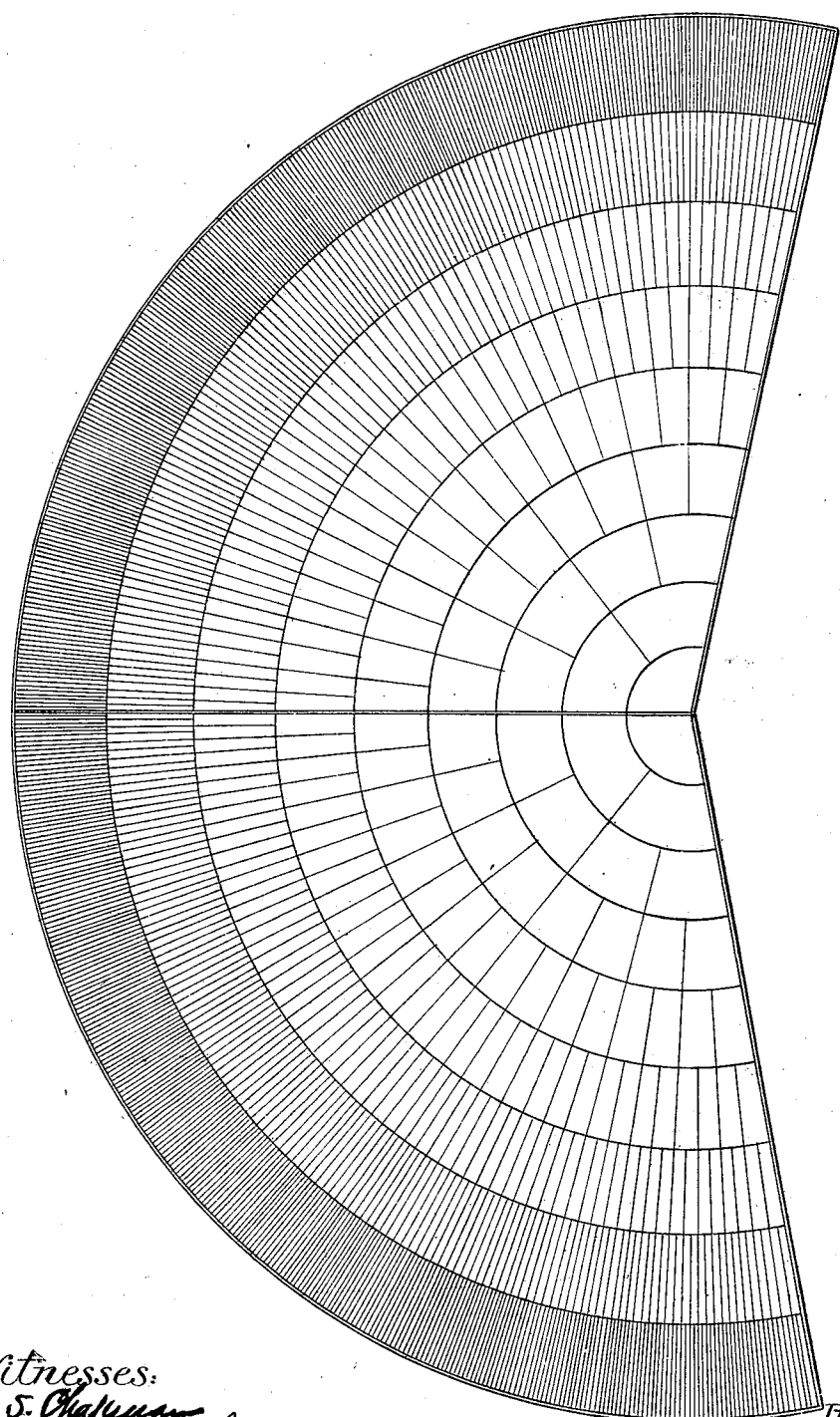

UNITED STATES PATENT OFFICE.

ROBERT H. CHAPMAN, OF WASHINGTON, DISTRICT OF COLUMBIA.

GENEALOGICAL CHART.

SPECIFICATION forming part of Letters Patent No. 627,718, dated June 27, 1899.

Application filed May 2, 1899. Serial No. 715,344. (No model.)

*To all whom it may concern:*

Be it known that I, ROBERT H. CHAPMAN, a citizen of the United States, residing at Washington, District of Columbia, have invented a new and useful Genealogical Skeleton Chart, of which the following is a specification, reference being had to the accompanying drawings.

My invention relates to the collation and graphic arrangement of the data of ancestors by generations.

It is my object to furnish some base or form for the student or collector of genealogical facts that will aid him in the arrangement of the memoranda he desires to record, so as to present to him a continuous comparative record.

The continuity of my chart will enable the investigator to arrange his statistics in uninterrupted and consecutive order. The arrangement enables the student to see at a glance the number, name, and completeness of record of his ancestors in any given generation.

To this end I have invented a chart on the segment of a circle or other curved figure, on which the student or collector may write or otherwise record the names, dates, or other facts relating to individual ancestors, together with the relationship which each ancestor bears to each preceding and succeeding generation.

More particularly describing the same, my chart or diagram is laid out within the area of a segment of a circle or other curved figure. Within the outer area and generally parallel to the circumference curved lines are drawn in gradually-diminishing arcs, dividing the total area into a number of segments of rings or zones, each of which is to receive the record of a single generation of ancestors. Radially from the center or an approximately central point a line is drawn to the circumference, dividing the area into two parts. These two parts are again divided by a radial line drawn from the circumference toward the middle point, but not to it, and ending at the outer perimeter of the first segment, counting outward from the center. The resulting four parts are again divided by radial lines from the circumference toward the center, but ending in the outer circumference of the second segment, counting from the center outward. Similar division of spaces is continued until the resulting spaces are too narrow to permit of the recording of names of ancestors between the radial lines or until the last or outer segment is divided.

Having thus described my invention, I claim—

A genealogical skeleton chart or diagram comprising a sheet of paper or other material, having thereon a series of concentric lines or arcs crossed by series of radial straight lines, each successive series of said radial lines terminating at the arc next succeeding the arc at which the preceding series of radial lines terminates, substantially as described.

ROBERT H. CHAPMAN.

Witnesses:
C. G. CUNNINGHAM,
E. S. CHAPMAN.